(12) United States Patent
Willy (10) Patent No.: US 7,631,605 B2
(45) Date of Patent: Dec. 15, 2009

(54) CONNECTION SYSTEM FOR FURNITURE

(75) Inventor: Scott Willy, Carmel, IN (US)

(73) Assignee: Simple Furniture Company, Indianapolis, IN (US)

( * ) Notice: Subject to any disclaimer, the term of this patent is extended or adjusted under 35 U.S.C. 154(b) by 139 days.

(21) Appl. No.: 11/697,420

(22) Filed: Apr. 6, 2007

(65) Prior Publication Data

US 2008/0245281 A1    Oct. 9, 2008

(51) Int. Cl.
*A47B 13/00* (2006.01)
(52) U.S. Cl. .................... 108/157.16; 248/188
(58) Field of Classification Search ............ 108/157.14, 108/157.16, 157.1, 157.12, 158.12; 248/188; 297/440.13
See application file for complete search history.

(56) References Cited

U.S. PATENT DOCUMENTS

| | | | | | |
|---|---|---|---|---|---|
| 136,056 | A | * | 2/1873 | Groves | 108/157.1 |
| 401,798 | A | * | 4/1889 | Spencer | 297/440.13 |
| 565,435 | A | * | 8/1896 | Crater | 108/157.1 |
| 795,957 | A | * | 8/1905 | Cartland | 108/157.16 |
| 900,247 | A | * | 10/1908 | Williams | 108/157.1 |
| 1,793,709 | A | * | 2/1931 | Meyers | 108/157.16 |
| 1,879,087 | A | * | 9/1932 | Chomik | 108/157.16 |
| 2,973,233 | A | * | 2/1961 | McPhee | 248/188 |
| 3,236,389 | A | * | 2/1966 | Murdock | 248/188 |
| 3,566,808 | A | * | 3/1971 | Slate et al. | 108/157.14 |
| 3,714,908 | A | * | 2/1973 | Notko | 108/157.14 |
| 4,084,517 | A | * | 4/1978 | Guess | 108/158.12 |
| 4,765,253 | A | * | 8/1988 | Schappach | 108/158.12 |
| 5,232,303 | A | * | 8/1993 | Rubner | 248/188 |
| 5,313,893 | A | * | 5/1994 | Kaneda et al. | 108/152 |
| 7,040,835 | B2 | * | 5/2006 | Sun | 108/158.12 |

* cited by examiner

*Primary Examiner*—José V Chen
(74) *Attorney, Agent, or Firm*—Maginot, Moore & Beck (57) ABSTRACT

An article of furniture comprises a horizontal planar member, and a support member for supporting the horizontal planar member. A connection system releasably secures the horizontal planar member to the support member. The connection system comprises a plurality of arcuate guide grooves on a bottom surface of the planar member and radially disposed about an axis of rotation, and a plurality of locking projections projecting from a top of the support member in positions corresponding to the plurality of guide grooves. The plurality of locking projections are configured to be received in the plurality of guide grooves and moved in the plurality of guide grooves between an insertion section of the groove and a locking section of the groove in response to relative rotation between the planar member and the support member about the axis of rotation.

8 Claims, 5 Drawing Sheets

CONNECTION SYSTEM FOR FURNITURE

TECHNICAL FIELD

This invention relates generally to articles of furniture. More specifically, the invention concerns furniture that is "ready-to-assemble" or knockdown.

BACKGROUND

Historically, furniture pieces are manufactured and assembled at the factory and then shipped as a complete unit to the distributor or customer. The sections of the piece are joined by large bolts which extend through predrilled holes in the sections. In some furniture, the assembly is covered with upholstery partially concealing the bolts. The resulting assembly can be cumbersome to deliver to the customer or simply transport from one location to another. Additionally, the size of the furniture piece may make delivery to certain locations impossible because of dimensional constraints in hallways, doorways and stairways. As a result, customers may have limited selection of furniture because of the size and weight of fully assembled furniture pieces.

Knock-down (KD) or ready-to-assemble (RTA) furniture has been developed in order to overcome such shortcomings and to provide increased options in the storage, delivery and moving of furniture. Unfortunately, early versions of ready-to-assemble furniture lacked strength and stability particularly under heavy loads. The furniture was perceived as flimsy and unreliable particularly as to the means for fastening the components of the furniture pieces. Screws or bolts were used to secure the components which tend to loosen upon extended use resulting in a breakdown of the piece. Such fasteners also do not lend themselves to quick and simple disassembly of the furniture piece requiring tools for removal of the bolts or screws. In some instances, repeated assembly and disassembly of the furniture piece may strip the fasteners ultimately resulting in their failure.

Customers within the display and furniture industries have recognized the need for versatile, portable, durable furniture units which are easy to assemble and disassemble, which will stack compactly for shipping or storage, and will easily reconfigure to meet changing needs. Such functional units of furniture have application as display stands for art galleries, tables and stools for retail and industry use, and furniture for children, trade shows, restaurants, and homes.

Conceptually functional units of furniture such as tables and stools involve the vertical support of a horizontally planar surface (e.g., the top of a given furniture unit) above another horizontally planar surface (e.g., the floor or an attached base of the given furniture unit). Pre-assembled furniture units are often bulky to warehouse, expensive to ship, and cumbersome to move. Furniture units labeled ready-to-assemble (RTA) or knock-down (KD) often require complicated assembly instructions, a lengthy time to complete the project, and no guarantee that the completed unit will disassemble and reassemble. Moreover, in the above, each furniture unit is likely offered as a set package which combines a predetermined height and width of vertical planar piece(s) with a predetermined length and width of horizontal piece(s). Neither vertical nor horizontal piece(s) can be easily reconfigured to create a different functional unit of furniture.

Using one known technique, the vertical structural members are held together using structural reinforcement members. These structural reinforcement members consist of short wooden dowels. The wooden dowels are inserted horizontally between the vertical structural members at the top and bottom of the vertical structural members to cause self alignment and increased structural integrity. Cams and bolts are used between the vertical structural members and the horizontally top planar surface. If there was a horizontally base planar surface, cams and bolts are also used between the horizontally base planar surface and the vertical structural members. There are problems with using wooden dowels to hold the vertical structural members together. Wooden dowels may break easily, and they have a tendency to swell in humid weather making assembly and disassembly difficult.

Another known technique uses short steel pins as structural reinforcement members instead of wooden dowels. Problems also occur with this technique since the short steel pins are not long enough to penetrate the interior of the vertical structural members sufficiently. With rough handling, the vertical structural members could be torqued out of alignment. This effects structural stability. Thus, despite a large effort expended by designers and manufacturers of furniture, many drawbacks still exist.

What is needed to overcome these problems associated with the prior art, is a ready to assemble article of furniture that has a minimal number of components that are configured to be easily assembled and disassembled without the need of tools, adhesives or other external fastening means.

SUMMARY

In order to address these needs, the present invention contemplates an article of furniture comprising a table top having a plurality of arcuate guide grooves in a bottom surface thereof radially disposed about an axis of rotation, each arcuate groove having an insertion section, a locking section and an arcuate guide section connecting the insertion and locking sections, the arcuate guide section having a radius of curvature centered on the axis of rotation; and a support member having a plurality of locking projections vertically projecting from a top of the support member in positions corresponding to the plurality of guide grooves. The insertion section of the guide grooves are configured to allow unobstructed movement of the locking projections orthogonally with respect to the bottom surface of the table top into and out of the guide grooves. The arcuate guide sections of the guide grooves are further configured to guide the locking projections from the insertion section to the locking section in response to rotation of the table top relative to the support member about the axis of rotation. The locking sections of the grooves are configured to receive the locking projections, and to prevent orthogonal movement of the locking projections out of the groove and lateral movement of the locking projections toward the insertion section of the grooves.

In one embodiment, the support member comprises a pair of vertically oriented, intersecting and interlocking panels, the panels having coplanar top edges from which the locking projections extend. In this embodiment, the plurality of locking projections comprises four locking projections, each locking projection being positioned on a section of the top edge of the support panel between an intersecting point of the panels and an end of the panel. The bottom surface of the table top preferably includes four guide grooves positioned on the bottom surface corresponding to the four locking projections.

The locking section of the guide grooves includes a pair of side walls and a base wall that define an undercut region for laterally receiving the locking projections, the locking projections being complementarily shaped to the undercut regions so that movement of the locking projection out of the groove is prevented. Preferably, the undercut region and locking projections are dovetail-shaped although any suitable shape may be utilized such as, for example, T-shaped.

In one embodiment, the base wall of the locking section is vertically offset from the guide section of the groove to allow at least a slight vertical movement of a corresponding locking projection received in the locking section of the groove. The offset base wall defines a retaining lip on an inner side of the locking section that is configured to allow lateral movement of a corresponding locking projection into the locking section of the groove and to abut the locking projection in the locking section to prevent lateral movement of the projection toward the insertion section of the groove.

According to another aspect of the invention, there is provided a connection system for releasably securing a horizontal planar member to a support member. The connection system comprises a plurality of arcuate guide grooves on a bottom surface of the planar member and radially disposed about a vertical axis of rotation, and a plurality of locking projections vertically projecting from a top of the support member in positions corresponding to the plurality of guide grooves. The plurality of locking projections are configured to be vertically received in the plurality of guide grooves and horizontally moved in the plurality of guide grooves between an insertion section of the groove and a locking section of the groove in response to rotation of the planar member relative to the support member about the axis of rotation.

DESCRIPTION OF THE FIGURES

Aspects and features of the present embodiments will become apparent as the following description proceeds and upon reference to the drawings, in which.

DESCRIPTION OF THE PREFERRED EMBODIMENT

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 1:
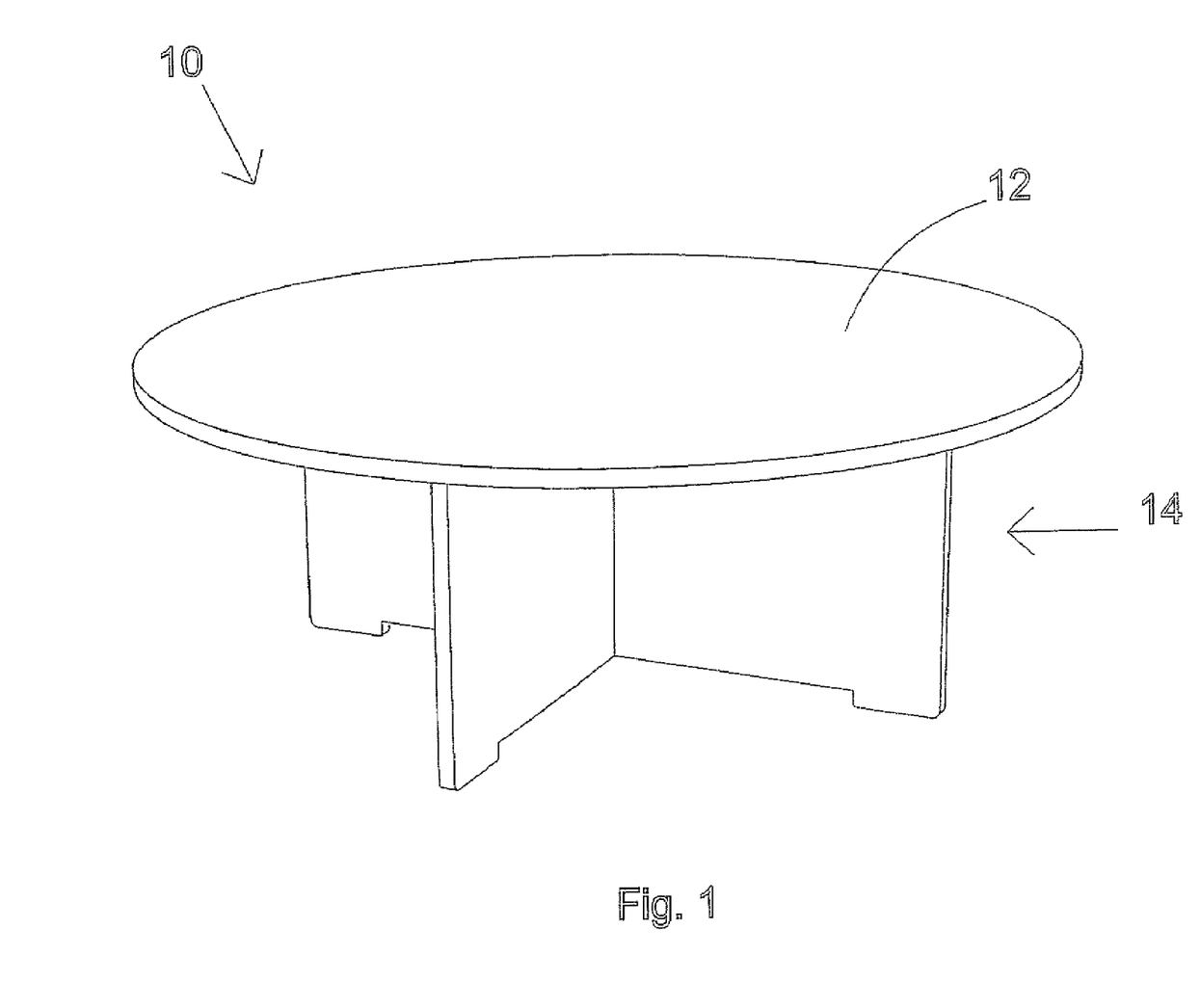
FIG. 1 is a perspective view of an embodiment of an interlocking ready-to-assemble table.

Referring to FIG. 1, one embodiment of the ready-to-assemble article of furniture of the present invention is illustrated. In this embodiment, the article of furniture is an interlocking table 10 that is readily and easily assembled from a few basic components without the use of tools, adhesives or separate fasteners. Specifically, the interlocking table 10 is formed by a planar top surface member, or table top, 12, supported by a base, or support member, 14. Each of the components is preferably formed of wood, either as solid wood elements or as pressed-wood or composite elements. Alternatively, the components can be formed of plastic or other suitable material. In order to maintain the ready-to-assemble attributes of the table 10, the material of the components should be sufficiently rigid, yet light-weight to facilitate the construction of the table.

Figure 2:
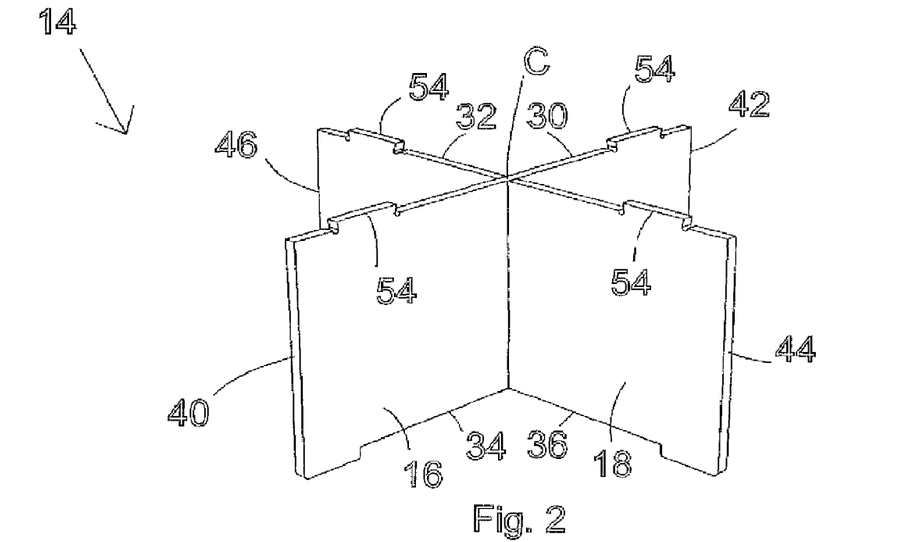
FIG. 2 is a perspective view of the assembled support member of the table of FIG. 1.
Figure 3:
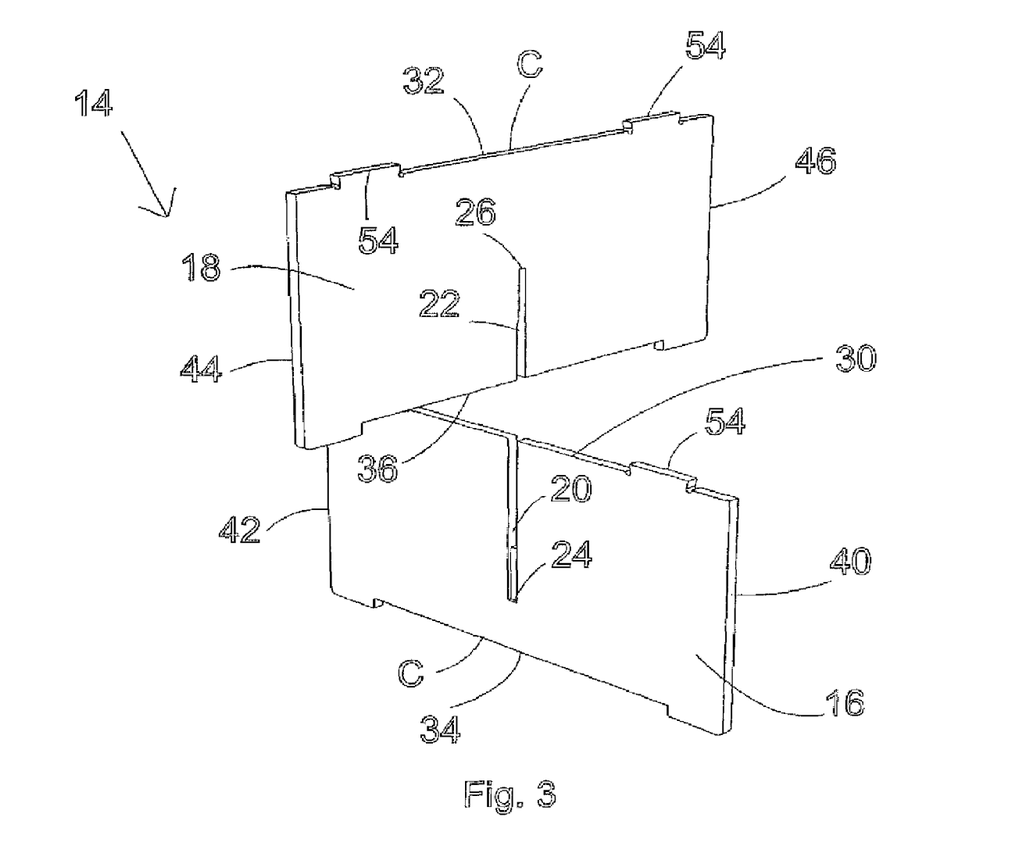
FIG. 3 is a perspective view of the support member of the table of FIG. 1 showing the component panels.

Referring to FIGS. 2 and 3, an embodiment of a support member 14 is shown in more detail. The support member 14 comprises a pair of intersecting and interlocking panels 16, 18. Each panel 16, 18 may be preferably a similarly sized and shaped rectangular member having a top edge 30, 32, a bottom edge, 34, 36 and a pair of ends 40, 42, 44, 46. Panel 16 includes a vertical slot 20 centered in the top edge 30 and extending from the top edge to approximately midway across the panel to the bottom edge 34. Panel 18 includes a complementary vertical slot 22 centered in the bottom edge 36 and extending from the bottom edge to approximately midway across the panel to the top edge 32.

Each slot 20, 22 has an inner end 24, 26. The width of the slots is approximately equal to or slightly greater than the width the panels 16, 18. The slots 20, 22 are configured to interlock so that when the panels are brought together (see FIG. 2), the inner ends of the slots 24, 26 abut with the respective top edges and bottom edges of the panels being substantially flush. Thus, when the support panels are interlocked, they form an X-shaped base structure that can remain free-standing on a floor. Although the support member 14 of the present invention has been described as comprising a pair of intersecting and interlocking panels, the support member may have any suitable configuration capable of providing a support for a table top. Moreover, while the panels 16, 18 are shown similarly configured, variations in each panel are contemplated for aesthetic or design reasons.

Figure 4:
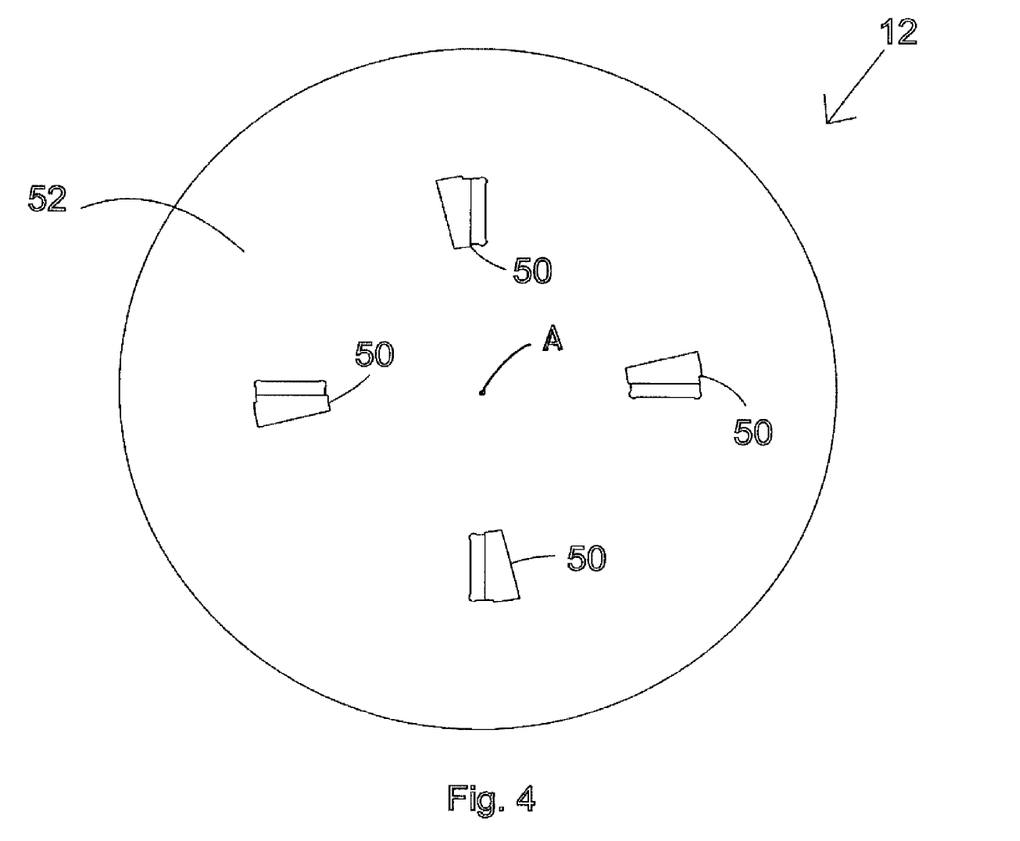
FIG. 4 is a bottom view of the table top of the table of FIG. 1.

In the embodiment of FIGS. 1 and 4, the table top 12 is a planar circular member. However, the table top 12 may be configured in a variety of shapes and configurations, including, but not limited to, polygon, square, rectangle, triangle, or any other regular or irregular shape. The support panels 16, 18 of the support member are configured to support the planar member, or table top, 12. To this end, the top edges 30, 32 of the support panels define a support edge upon which the table top rests.

To secure the table top 12 to the support member 14, a connection system is provided that comprises a plurality of guide grooves 50 formed in the bottom surface 52 of the table and a plurality of locking projections 54 (FIGS. 2 and 3) that extend from the top edges of the support panels. The plurality of locking projections 54 and guide grooves 50 are complementarily positioned on the top edges of the assembled support panels and the bottom surface of the table top, respectively, and radially disposed about a predetermined point A on the table top. The predetermined point A corresponds to an axis of rotation about which the table top may be rotated with respect to the support member, or, alternatively, the support member may be rotated with respect to the table top. Generally, the plurality of locking projections 54 is configured to be simultaneously inserted into the plurality of guide grooves 50 orthogonally with respect to the bottom surface 52 of the table. Then, upon rotation of the table top or support member about the axis of rotation A, the inserted locking projections 54 are guided laterally into a locking position in the guide grooves 50 thereby securing the table top to the support member.

Referring to FIG. 4, there is shown a view of the bottom surface 52 of an embodiment of the table top 12 with the plurality of guide grooves 50 formed therein. As shown, each guide groove 50 is radially disposed about the axis of rotation A on the table top. The axis of rotation A is preferably the center point of the table top; however, any suitable location on the table top may be used. Although each guide groove 50 is shown positioned substantially equidistant from the axis of rotation, the distances for each guide groove 50 may be different depending on the configuration of the table top and/or support member. In addition, the number of guide grooves and locking projections may be dependent on the configuration of the table top and/or the support member. In this embodiment, the X-shaped configuration of the support member includes a locking projection on each section of the panels extending from the intersecting point of the panels for a total of four locking projections. Accordingly, the table top includes four guide grooves 50. In other embodiments, more or fewer guide grooves may be implemented. Preferably, at least two guide grooves and locking projections are employed that are positioned on opposite sides of the axis of rotation.

Figure 5:
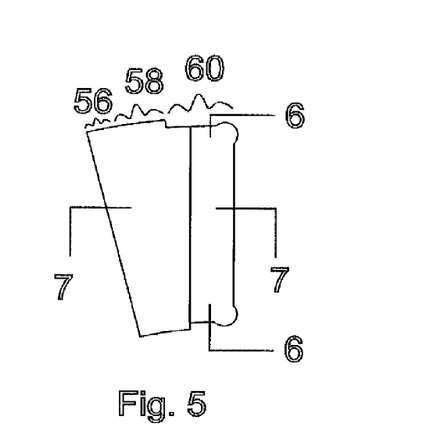
FIG. 5 is a close-up view of a guide groove shown in FIG. 4.
Figure 6:
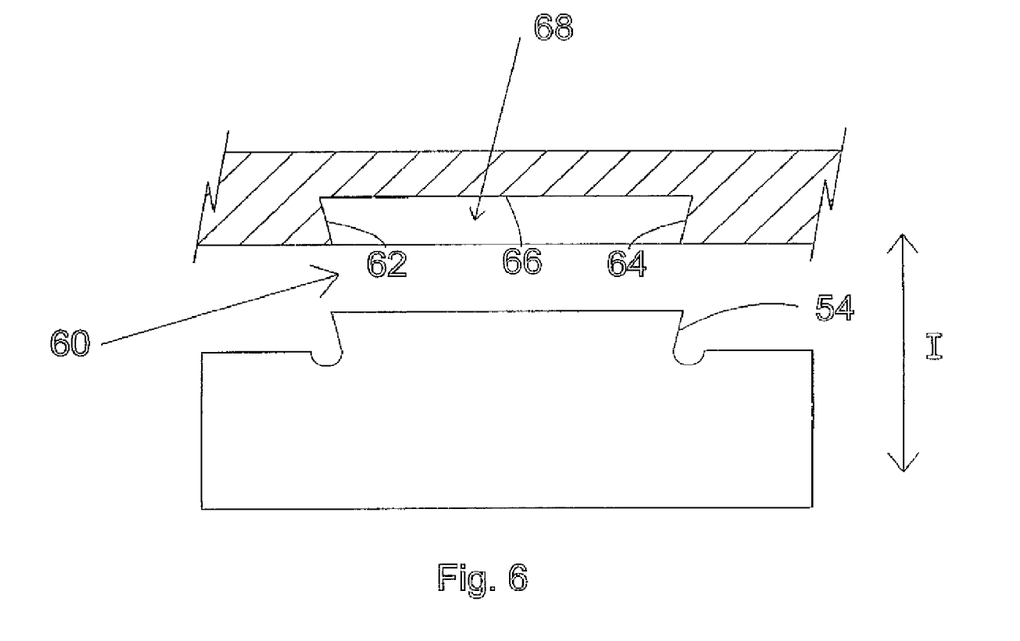
FIG. 6 is a cross-sectional view of the guide groove taken along lines 6-6 of FIG. 5.
Figure 7:
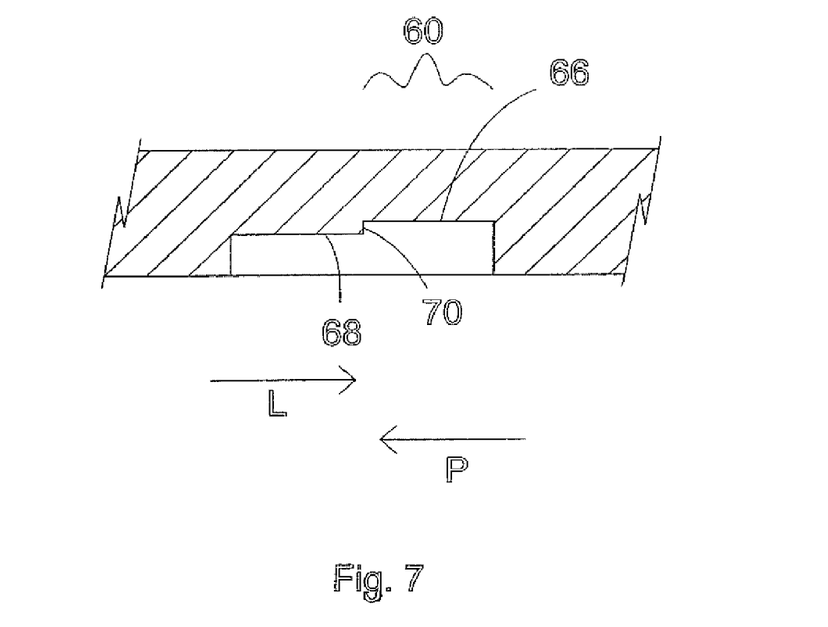
FIG. 7 is a cross-sectional view of the guide groove taken along lines 7-7 of FIG. 5.

Referring to FIGS. 5-7, there is shown an enlarged view of one embodiment of a guide groove 50. In this embodiment, each guide groove 50 includes an insertion section 56, a locking section 58, and an arcuate guide section 60 connecting the insertion 56 and locking sections 60. The insertion section 56 of the groove 50 is dimensioned to allow unobstructed movement of a corresponding locking projection 54 into and out of the groove in a direction I that is substantially orthogonal to the bottom surface 52 of the table top. The arcuate guide section 58 is configured to laterally guide a locking projection 54 in direction L from the insertion section 56 of the groove to the locking section 60 of the groove during rotation of the table top with respect to the support member. To this end, each arcuate section of the guide grooves has a radius of curvature centered on the axis of rotation A. The arcuate form of the guide grooves, thus, corresponds to the movement travel of the corresponding locking projections during rotation of the table top or support member.

Figure 8:
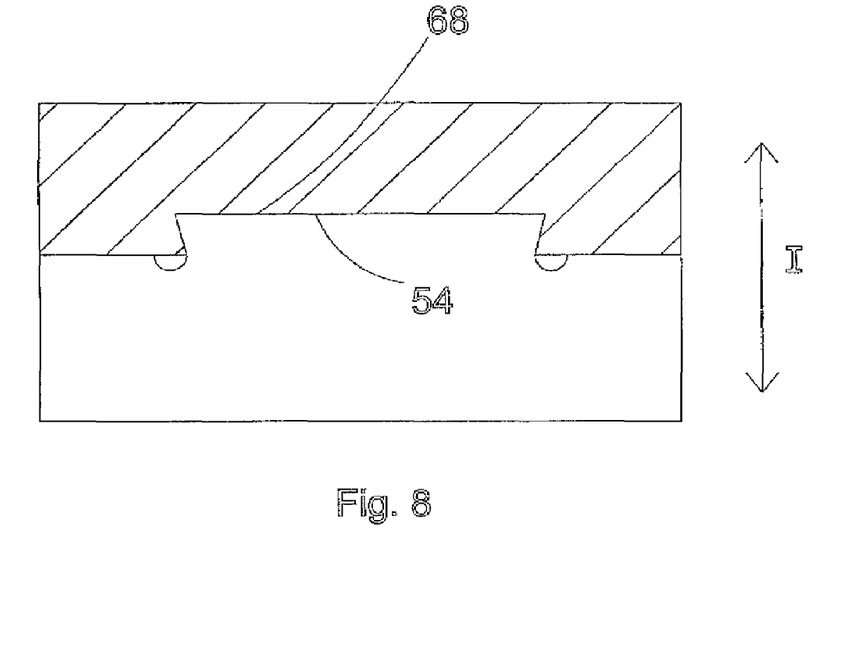
FIG. 8 is another cross-sectional view of the guide groove taken along lines 6-6 of FIG. 5.

Once a locking projection 54 has been received in a locking section 60 of a groove, the locking section 60 is configured to secure the locking projection to prevent orthogonal, or vertical, movement of the locking projection with respect to the bottom surface of the table as well as prevent lateral movement of the projection back toward the insertion section of the groove. Referring to FIG. 6, the locking section of the guide groove includes sidewalls 62 and 64, and a base wall 66. The side walls 62, 64 and base wall 66 cooperate to define an undercut region 68 configured to slidingly receive the locking projections 54 upon rotation of the table top with respect to the support member. The undercut region 68 and the locking projections 54 are preferably complementarily shaped as shown in FIGS. 6 and 8. The undercut region 68 and complementary shaped locking projection 54 interact to limit or prevent orthogonal movement of the locking projections 54 into and out of the locking section of the groove 50.

In one embodiment, the undercut region 68 is dovetail shaped for receiving a complementarily shaped dovetail locking projection 54 as shown in FIGS. 6 and 8. In the embodiment of the support member of FIGS. 2 and 3, each locking projection 54 extends vertically from the top, or support, edge of the panel substantially centered between the intersecting point C of the panel and one of the ends of the panel. Thus, in this embodiment of the support member, four substantially identical locking projections 54 are provided. Preferably, the projections 54 are formed integrally with the respective support panels. However, the projections may be formed separately and then attached to the support panels. Although a dovetail-shaped locking region and locking projection is described, it is contemplated that other appropriate shapes of undercut grooves and projections, such as a T-shapes and even L-shapes, may be utilized.

Figure 9:
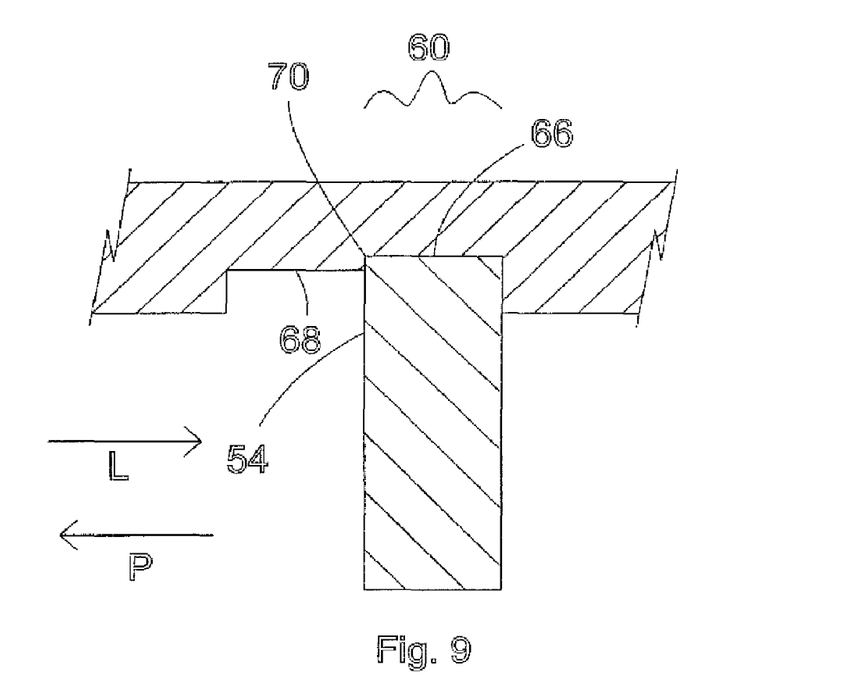
FIG. 9 is another cross-sectional view of the guide groove taken along lines 7-7 of FIG. 5.

The locking section 60 of the guide grooves 50 may include any suitable structure or configuration for preventing lateral movement of a locking projection 54 toward the insertion section 56 of the guide groove. In one embodiment, the base wall 66 of the locking section of the groove 50 is vertically offset from the base 68 of the guide section of the groove as shown in FIG. 7. The offset base wall 66 of the locking section defines a retaining edge, or lip, 70 on the inner side of the locking section 60. The retaining edge 70 is configured to allow passage of a locking projection into the locking section of the groove in direction L. Once the locking projection 54 passes over the retaining edge 70, the offset base wall 66 of the locking section allows at least a slight vertical movement of the projection 54 relative to the groove 50 so that, in effect, the projection becomes seated in the locking section 60 (see FIG. 9). The retaining edge 70 then abuts the locking projection 54 thereby obstructing movement of the locking projection toward the insertion section of the groove in direction P. It can be appreciated that, in this embodiment, gravity contributes to the downward force necessary to keep the top edge of the locking projection 54 engaged with the offset base wall 66 thereby maintaining the abutting relationship between the retaining edge 70 of the locking section and the side of the locking projection 54.

To remove the table top from the support member, the table top is moved vertically with respect to the support member so that the top edge of the locking projections 54 is no longer in an abutting relation with the retaining edge 70 of the locking section of the grooves. The table top 12 may then be rotated in the opposite direction so that the locking projections 54 are slidingly guided from the locking section of the groove to the insertion section at which point the locking projections may be removed from the grooves.

Although, the locking section 60 has been described as having a vertically offset base wall configured to limit lateral movement of the locking projections, other suitable configurations are contemplated. For instance, instead of being offset, the base of the groove may include a detent adjacent the locking section that includes a ramped edge on one side to allow movement toward the locking section and a flat edge on the inner side of the locking section that acts in a manner similar to the retaining edge, or lip, described above.

What has been described thus far are three panels which constitute support panels and a top surface of a table. All three panels interlock to provide a sturdy structure that may be easily assembled and disassembled by hand and that does not require the use of tools, adhesives, or other fastening means to construct.

The rotate-to-lock feature for fastening the table top to the support member is particularly advantageous because it provides a secure connection that is both easy to assemble and resistant to inadvertent dislodgment or disconnection. The rotational force necessary to lock the dovetail projections in the guide grooves may be applied by grasping the table top on opposite sides and applying the necessary torque while the support member remains stationary. Alternatively, the table top may be placed on the floor so that the bottom surface is facing upward, and the support member may be inverted so that the rotational force may be applied to the support member while the table top remains stationary. In either case, the "locking" force may be provided from a relative stable position by one or more people. There is no need to assume unnatural or unstable positions in order to access mechanical fasteners, to apply adhesives, etc. Moreover, because the force used for securing and removing the table top from the support member is primarily rotational, any linear force that may be applied to the table top during normal use, such as by pushing on the table top to move the table or by accidentally bumping into table top, provides little risk of dislodging or disconnecting the top panel from the support member.

Another benefit of the ready-to-assemble articles of furniture described above, depending on the selection of materials for construction, is that the construction of the furniture panels, assembly and disassembly is not harmful to the environment. For example, because extraneous fastening means are not required, toxic and environmentally hazardous adhesives may be avoided. In addition, the panels may be formed from reclaimed or renewable wood sources, recycled or recyclable materials, etc. Thus, in some embodiments, the articles of furniture of the present invention may be considered environmentally "friendly."

It should be readily apparent to those of ordinary skill in the art that the connection system of the present invention may be used to connect table tops to almost any configuration of support member. Moreover, the connection system is also particularly suited for use with other types of furniture. For instance, the connection system may be useful in connection of planar members to support structures for articles of furniture such as stools, chairs, display stands, etc. It should be further apparent that this connection system only minimally dictates the overall configuration of the connected components. While the placement of the guide grooves and locking projections must be consistent, all other features of the connected panels may be modified as needed for aesthetic or functional reasons.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. An article of furniture comprising:
  a first panel having a plurality of arcuate guide grooves in a bottom surface thereof radially disposed about an axis of rotation, each arcuate groove having an insertion section, a locking section and an arcuate guide section connecting the insertion and locking sections, the arcuate guide section having a radius of curvature centered on the axis of rotation; and
  a support member having a plurality of locking projections projecting from a top of the support member in positions corresponding to the plurality of guide grooves;
  wherein the insertion section of each of the guide grooves is configured to allow movement of a respective locking projection into and out of the guide groove orthogonally with respect to the bottom surface;
  wherein the arcuate guide section of the guide grooves are each configured to guide a respective locking projection between the insertion section and the locking section in response to relative rotation between the first panel and support member about the axis of rotation;
  wherein the locking section of the grooves are configured to receive the locking projections from the arcuate guide sections and to prevent orthogonal movement of the received locking projections out of the groove;
  wherein said locking section of the guide grooves includes a pair of side walls, said side walls defining an undercut region that is complementarily shaped to the corresponding locking projection received therein so that orthogonal movement of the locking projection out of the groove is prevented; and
  wherein said locking section further includes a base wall that is offset from said arcuate guide section to define a retaining lip on an inner side of the locking section that is configured to allow movement of the corresponding locking projection into the locking section of the groove and to abut the locking projection in the locking section to prevent movement of the locking projection toward the insertion section of the groove.

2. The article of furniture of claim 1, wherein the support member includes a pair of vertically oriented, intersecting and interlocking panels, the panels having substantially coplanar top edges from which the locking projections extend.

3. The article of furniture of claim 2, wherein the plurality of locking projections includes four locking projections, each locking projection being positioned on a section of the top edge of a corresponding support panel between an intersecting point of the panels and an end of the panel; and
  wherein the plurality of guide grooves includes four guide grooves positioned on the bottom surface corresponding to the four locking projections.

4. The article of furniture of claim 1, wherein the undercut region and locking projections are dovetail-shaped.

5. An article of furniture comprising:
  a horizontal planar member;
  a support member for supporting the horizontal planar member; and
  a connection system for releasably securing the horizontal planar member to the support member;
  wherein the connection system comprises a plurality of arcuate guide grooves on a bottom surface of the planar member and radially disposed about an axis of rotation that is substantially orthogonal to the bottom surface, and a plurality of locking projections projecting from a top of the support member in positions corresponding to the plurality of guide grooves; and
  wherein the plurality of locking projections are configured to be simultaneously received in an insertion section of the plurality of guide grooves and moved between the insertion section of the groove and a locking section of the groove in response to relative rotation between the planar member and the support member about the axis of rotation;
  wherein said locking section of the guide grooves includes a pair of side walls, said side walls defining an undercut region that is complementarily shaped to the corresponding locking projection received therein so that orthogonal movement of the locking projection out of the groove is prevented; and
  wherein said locking section further includes a base wall that is offset from said arcuate guide section to define a retaining lip on an inner side of the locking section that is configured to allow movement of the corresponding locking projection into the locking section of the groove and to abut the locking projection in the locking section to prevent movement of the locking projection toward the insertion section of the groove.

6. The article of furniture of claim 5, wherein the insertion section of the guide grooves are configured to allow unobstructed movement of the locking projections into and out of the guide grooves orthogonally with respect to the bottom surface of the planar member.

7. The article of furniture of claim 6, wherein the guide grooves include an arcuate guide section, the arcuate guide section having a radius of curvature centered on the axis of rotation, the arcuate guide section being configured to guide the locking projections from the insertion section to the locking section in response to relative rotation between the planar member and the support member about the axis of rotation.

8. The article of furniture of claim 5, wherein the undercut region and locking projections are dovetail-shaped.

* * * * *

UNITED STATES PATENT AND TRADEMARK OFFICE
CERTIFICATE OF CORRECTION

| | |
|---|---|
| PATENT NO. | : 7,631,605 B2 |
| APPLICATION NO. | : 11/697420 |
| DATED | : December 15, 2009 |
| INVENTOR(S) | : Willy et al. |

Page 1 of 1

It is certified that error appears in the above-identified patent and that said Letters Patent is hereby corrected as shown below:

On the Title Page, Item (75)

After "Scott Willy, Carmel, IN (US)", please add "William Lepage, Brownsburg, IN (US)"

Signed and Sealed this

Twentieth Day of July, 2010

David J. Kappos
*Director of the United States Patent and Trademark Office*